United States Patent
Kakiuchi et al.

(10) Patent No.: US 9,415,732 B2
(45) Date of Patent: Aug. 16, 2016

(54) VEHICLE POWER UNIT

(75) Inventors: Kimiyasu Kakiuchi, Osaka (JP);
Hisazumi Watanabe, Osaka (JP);
Masato Wagatsuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 403 days.

(21) Appl. No.: 14/128,410

(22) PCT Filed: Jul. 4, 2012

(86) PCT No.: PCT/JP2012/004322
§ 371 (c)(1),
(2), (4) Date: Dec. 20, 2013

(87) PCT Pub. No.: WO2013/014866
PCT Pub. Date: Jan. 31, 2013

(65) Prior Publication Data
US 2014/0132063 A1   May 15, 2014

(30) Foreign Application Priority Data

Jul. 22, 2011 (JP) .................. 2011-160584
Aug. 24, 2011 (JP) .................. 2011-182385

(51) Int. Cl.
*B60L 1/00* (2006.01)
*B60L 3/00* (2006.01)
(Continued)

(52) U.S. Cl.
CPC . *B60R 16/03* (2013.01); *B60L 7/12* (2013.01); *B60L 11/005* (2013.01); *B60L 11/14* (2013.01);
(Continued)

(58) Field of Classification Search
CPC .... B60L 11/005; B60L 11/1855; B60R 16/03
USPC ......................................... 307/9.1
See application file for complete search history.

(56) References Cited

U.S. PATENT DOCUMENTS 9,024,466 B2* 5/2015 Winkler ............... B60R 16/03
307/9.1
2007/0132313 A1 6/2007 Baeuerle
2010/0007213 A1 1/2010 Morita et al.

FOREIGN PATENT DOCUMENTS

CN  101511628     8/2009
JP  05-300660 A   11/1993
(Continued)

OTHER PUBLICATIONS

English Translation of Chinese Search Report dated Jun. 26, 2015 for the related Chinese Patent Application No. 201280036299.5.
(Continued)

*Primary Examiner* — Carlos Amaya
(74) *Attorney, Agent, or Firm* — McDermott Will & Emery LLP

(57) ABSTRACT

A vehicle power unit is operable to, when not driving the starter, charge first and second capacitors. A controller is operable to, when driving the starter, cause the battery to supply power to the starter if a total voltage of first and second capacitor voltages is smaller than a predetermined total voltage. The controller is operable to, when driving the starter, form a parallel circuit of the battery and the first capacitor, and connect the second capacitor in series to the parallel circuit if the total voltage is not smaller than the predetermined total voltage at a beginning of use of the vehicle. The controller is operable to, when driving the starter, disconnect the battery from the starter. The vehicle power unit reduces a load applied to the battery when driving the starter, accordingly extending a life time of the battery.

7 Claims, 6 Drawing Sheets

(51) Int. Cl.

| | |
|---|---|
| *H02G 3/00* | (2006.01) |
| *B60R 16/03* | (2006.01) |
| *H02J 1/08* | (2006.01) |
| *B60L 7/12* | (2006.01) |
| *B60L 11/00* | (2006.01) |
| *B60L 11/14* | (2006.01) |
| *B60L 11/18* | (2006.01) |
| *H02J 1/00* | (2006.01) |

(52) U.S. Cl.
CPC ............... *B60L 11/1868* (2013.01); *H02J 1/08* (2013.01); *B60L 2210/10* (2013.01); *B60L 2240/80* (2013.01); *H02J 2001/008* (2013.01); *Y02T 10/70* (2013.01); *Y02T 10/7005* (2013.01); *Y02T 10/7022* (2013.01); *Y02T 10/7066* (2013.01); *Y02T 10/7077* (2013.01); *Y02T 10/7216* (2013.01)

(56) References Cited

FOREIGN PATENT DOCUMENTS

| | | |
|---|---|---|
| JP | 2004-282800 A | 10/2004 |
| JP | 2005-020824 A | 1/2005 |
| JP | 2006-029142 A | 2/2006 |
| JP | 2006-526379 A | 11/2006 |
| JP | 3885771 B2 | 2/2007 |
| JP | 2008-289270 | 11/2008 |
| JP | 2010-279148 A | 12/2010 |
| WO | 2004/102768 A1 | 11/2004 |

OTHER PUBLICATIONS

International Search Report issued in International Application No. PCT/JP2012/004322 mailed Oct. 9, 2012, with English translation, 4 pgs.

\* cited by examiner

VEHICLE POWER UNIT

RELATED APPLICATIONS

This application is the U.S. National Phase under 35 U.S.C. §371 of International Application No. PCT/JP2012/004322, filed on Jul. 4, 2012, which in turn claims the benefit of Japanese Application No. 2011-160584, filed Jul. 22, 2011, and Japanese Application No. 2011-182385, filed Aug. 24, 2011, the disclosures of which are incorporated by reference herein.

TECHNICAL FIELD

The present disclosure relates to a vehicle power unit to be used in a vehicle that has a start-stop system.

BACKGROUND ART

A vehicle having a stop-idling system has been developed in recent years for saving energy. The stop-idling system stops an engine when the vehicle stops for, e.g. waiting for a traffic light to change. When this vehicle restarts the engine with a battery which is obliged to drive a starter, a load having a large capacity, a terminal voltage of the battery drops, accordingly causing malfunction of other electric components installed in the vehicle.

FIG. 6 shows a circuit diagram of vehicle power unit 501 disclosed in Patent Literature 1. Vehicle power unit 501 compensates a voltage drop at the terminal of a battery. In power unit 501, battery 101 is connected to DC/DC converter 103 which includes booster circuit 105 for boosting the terminal voltage of battery 101, and capacitor 107 connected between the terminal of battery 101 and an output terminal of booster circuit 105. Since a series connection between battery 101 and capacitor 107 generates a power supply voltage, DC-DC converter 103 charges capacitor 107 to compensate the voltage drop at the terminal of battery 101.

Vehicle power unit 501 allows capacitor 107 to compensate the voltage drop of the terminal voltage of battery 101, so that the power supply voltage can be stabilized. However, vehicle power unit 501 of the vehicle having a stop-idling system may stabilize the power supply voltage, but provides battery 101 with a heavy load since the restart of the engine requires driving the starter, which needs a large current supplied from battery 101.

CITATION LIST

Patent Literature

Patent Literature 1: Japanese Patent No. 3885771

SUMMARY

A vehicle power unit is configured to be installed in a vehicle that includes an engine, a starter for starting the engine, and a battery for driving the starter. The vehicle power unit includes first to fifth switches, first and second capacitors, a semiconductor switching element, and a controller. The first switch is configured to be connected to a positive electrode of the battery. The first capacitor has a positive electrode and a negative electrode. The positive electrode of the first capacitor is configured to be connected to the positive electrode of the battery via the first switch. The negative electrode of the first capacitor is connected to a ground. The second switch is connected to the positive electrode of the first capacitor. The second capacitor has a positive electrode and a negative electrode. The negative electrode of the second capacitor is connected to the positive electrode of the first capacitor via the second switch. The negative electrode of the second capacitor is connected to the second switch at a node. The third switch is connected between the ground and the node at which the second switch is connected to the negative electrode of the second capacitor. The fourth switch is connected to the positive electrode of the second capacitor. The fifth switch is configured to be connected between the starter and the positive electrode of the battery. The semiconductor switching element is connected to the positive electrode of the second capacitor, and configured to connect and disconnect between the positive electrode of the battery and the positive electrode of the second capacitor. The positive electrode of the second capacitor is configured to be connected to the starter via the fourth switch. The controller is operable to, when not driving the starter, control the first to fifth switches as to charge the first capacitor and the second capacitor. The controller is operable to, when driving the starter, control the first to fifth switches as to cause the battery to supply power to the starter if a total voltage of a first capacitor voltage which is a voltage between the positive electrode and the negative electrode of the first capacitor and a second capacitor voltage which is a voltage between the positive electrode and the negative electrode of the second capacitor is smaller than a predetermined total voltage. The controller is operable to, when driving the starter, control the first to fifth switches as to form a parallel circuit including the battery and the first capacitor connected in parallel to each other, and as to connect the second capacitor in series to the parallel circuit for supplying power to the starter if the total voltage is not smaller than the predetermined total voltage at a beginning of use of the vehicle. The controller is operable to, when driving the starter, control the first to fifth switches as to disconnect the battery from the starter, and as to connect the first capacitor in series to the second capacitor for supplying power to the starter if the total voltage is not smaller than the predetermined total voltage during the vehicle in use.

The vehicle power unit reduces a load applied to the battery when driving the starter, accordingly extending a life time of the battery.

DETAIL DESCRIPTION OF PREFERRED EMBODIMENT

Figure 1:
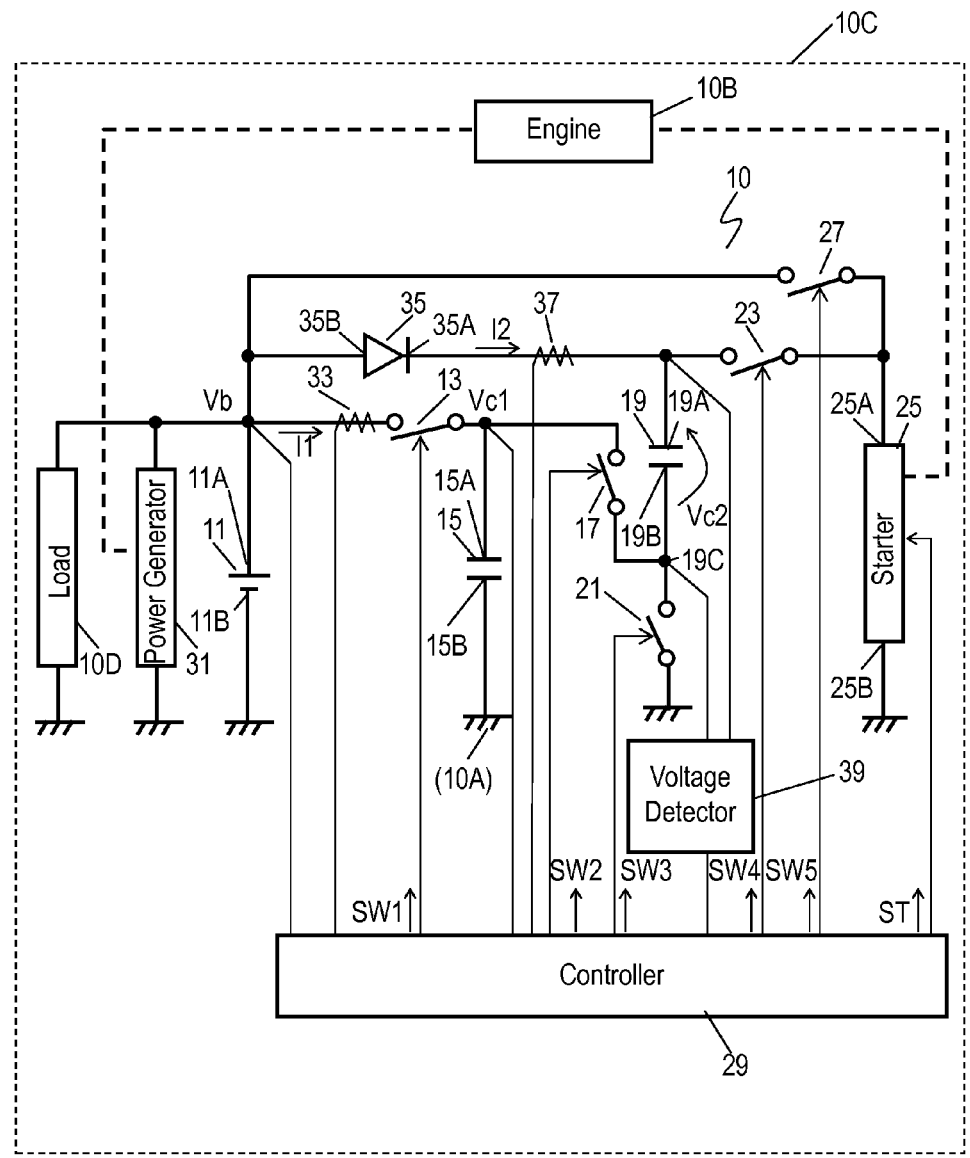
FIG. 1 is a circuit block diagram of a vehicle power unit in accordance with an exemplary embodiment of the present invention.

FIG. 1 is a circuit block diagram of vehicle power unit 10 in accordance with an exemplary embodiment of the present invention. In FIG. 1, thick lines represent power-related wirings while thin lines represent signal-related wirings. Vehicle 10C according to this embodiment has a stop-idling system that stops engine 10B when vehicle 10C halts. Vehicle 10C includes engine 10B, starter 25 for starting up engine 10B, and battery 11 for driving starter 25. Vehicle power unit 10 is configured to be installed in vehicle 10C.

Vehicle power unit 10 includes switch 13 connected to positive electrode 11A of battery 11, capacitor 15 having positive electrode 15A connected to battery 11 via switch 13 and negative electrode 15B connected to ground 10A, switch 17 connected to positive electrode 15A of capacitor 15, capacitor 19 having negative electrode 19B connected to positive electrode 15A of capacitor 15 via switch 17, switch 21 electrically connected between ground 10A and a node at which switch 17 is connected to negative electrode 19B of capacitor 19, switch 23 connected to positive electrode 19A of capacitor 19, switch 27 configured to be connected between positive electrode 11A of battery 11 and starter 25, a semiconductor switching element which is diode 35 connected between positive electrode 11A of battery 11 and positive electrode 19A of capacitor 19, and controller 29 electrically connected to switches 13, 17, 21, 23, and 27. Positive electrode 19A of capacitor 19 is configured to be connected to starter 25 via switch 23. Anode 35B of diode 35 is connected to positive electrode 11A of battery 11 while cathode 35A of diode 35 is connected to positive electrode 19A of capacitor 19. Negative electrode 11B of battery 11 is connected to ground 10A. Controller 29 controls switches 13, 17, 21. 23, and 27 for charging capacitors 15 and 19 while starter 25 does not operate. Voltage detector 39 detects capacitor voltage Vc2 that is a voltage between positive electrode 19A and negative electrode 19B of capacitor 19. Controller 29 detects capacitor voltage Vc1 that is a voltage between positive electrode 15A and negative electrode 15B of capacitor 15. When starter 25 starts operating, controller 29 controls switches 13, 17, 21, 23, and 27 such that battery 11 supplies power to starter 25 if a total voltage (Vc1+Vc2) of capacitor voltages Vc1 and Vc2 is smaller than predetermined total voltage Vck. If the total voltage (Vc1+Vc2) is not smaller than predetermined total voltage Vck at the beginning of use of vehicle 10C, controller 29 controls switches 13, 17, 21, 23, and 27 as to form a parallel circuit including battery 11 and capacitor 15 connected in parallel to each other, and as to connect capacitor 19 in series to the parallel circuit. If the total voltage (Vc1+Vc2) is not smaller than predetermined total voltage Vck during vehicle 10C is in use, controller 29 controls switches 13, 17, 21, 23, and 27 as to disconnect battery 11 from capacitor 15, and as to connect capacitor 15 only in series to capacitor 19. Depending on situations, controller 29 supplies power to starter 25 from battery 11 alone. from both of capacitors 15 and 19, or from all of battery 11 and capacitors 15 and 19.

The above operation allows controller 29 to form the parallel circuit of capacitor 15 and battery 11, and to connect capacitor 19 in series to this parallel circuit at a cold-start when engine 10B starts up at the beginning of use of vehicle 10C. At the cold-start which requires starter 25 to generate a largest torque, power stored in capacitors 15 and 19 having small inner resistances is supplied to starter 25 prior to power of battery 11. This operation reduces a current flowing from batter 11, thus reducing a load on battery 11. When a user restarts engine 10B during vehicle 10C halts during in use, only the power stored in capacitors 15 and 19 is supplied to starter 25 while the power of battery 11 is not supplied to starter 25. Almost no current flows from battery 11 to starter 25. Only when the total voltage (Vc1+Vc2) is smaller than battery voltage Vb, battery 11 alone drives starter 25. This operation reduces the load on battery 11, and extending a life time of battery 11.

The operation of vehicle power unit 10 in accordance with the embodiment will be described in detail below.

First, the power-related wirings will be detailed.

Power generator 31 installed in vehicle 10C is driven by engine 10B for generating electric power. When vehicle 10C is braked, power generator 31 generates regenerative power. Power generator 31 is electrically connected to battery 11 and load 10D via the power-related wirings. Load 10D may be various electric devices, such as a car-audio device. Battery 11 is a lead battery and generates open-circuit voltage Vb0 of 12V between positive electrode 11A and negative electrode 11B. Open-circuit voltage Vb0 of battery 11 is battery voltage Vb between positive electrode 11A and negative electrode 11B while no load is connected to battery 11.

Positive electrode 11A of battery 11 is electrically connected to positive electrode 15A of capacitor 15 via switch 13. Switch 13 can be controlled from outside to be turned on and off and to limit a current flowing therethrough to a predetermined current. According to the present embodiment, switch 13 is implemented by a field-effect transistor (FET). The predetermined current can be arbitrarily determined. In other words, switch 13 is controlled by external switch-control signal SW1 to be turned on and off and to control a current while being turned on. Switch 13 is necessarily implemented not by the FET but by another configuration, such as a combination of a relay and a resistor, which can be controlled to be turned on and off and to limit the current.

Capacitor 15 includes five electric double layer capacitors connected in series. Each of the capacitors has a rated charging voltage of 2.5 V. According to this embodiment, the rated charging voltage is defined as a charging voltage that allows a life time of the electric-double-layer capacitors to exceed a life time of vehicle 10C. The rated charging voltage of the entire capacitor 15 in this embodiment is 12.5V.

Switch 13 is connected in series to current sensor 33 which detects current I1 flowing to switch 13 and includes a shunt resistor. Current sensor 33 outputs a voltage in proportion to current I1 based on a voltage across the shunt resistor. Current sensor 33 is not necessarily the shunt resistor, but may be a sensor, such as a Hall element, that can sense a current based on magnetic field.

Positive electrode 15A of capacitor 15 is connected to negative electrode 19B of capacitor 19 via switch 17. Switch 17 is implemented by an FET like switch 13. Switch 17 is controlled by external switch-control signal SW2 to be turned on or off, and to limit a current flowing therethrough during while being turned on. Capacitor 19 includes two electric double layer capacitors connected in series. Each of these capacitors has a rated charging voltage of 2.5V, hence providing the entire capacitor 19 with the rated charging voltage of 5V.

When capacitor 15 is charged by battery 11, capacitor voltage Vc1 reaches 12V since open-circuit voltage Vb0 of battery 11 is 12V. As discussed above, capacitor 19 has the rated charging voltage of 5V. When switch 17 is turned on, the total voltage (Vc1+Vc2), the sum of capacitor voltage Vc1 and capacitor voltage Vc2, is 17V.

Switch 21 is electrically connected between ground 10A and node 19C at which switch 17 is connected to negative electrode 19B of capacitor 19. Switch 21 is implemented by an FET like switch 13, and is controlled by external switch-control signal SW3 to be turned on and off and to control a current flowing therethrough while being turned on.

Positive electrode 19A of capacitor 19 is connected to positive electrode 11A of battery 11 via diode 35. Cathode 35A of diode 35 is connected to positive electrode 19A of capacitor 19 while anode 35B of diode 35 is connected to positive electrode 11A of battery 11. As discussed above, the total voltage (Vc1+Vc2) of capacitor voltages Vc1 and Vc2 reaches 17V when each capacitor is charged to have the rated charging voltage, so that the total voltage exceeds battery voltage Vb between positive electrode 11A and negative electrode 11B of battery 11. Diode 35 thus prevents the current from flowing back to battery 11 from the series circuit constituted by capacitors 15 and 19 connected in series to each other.

Diode 35 is connected in series with current sensor 37 having the same structure as current sensor 33.

Positive electrode 19A of capacitor 19 is electrically connected to end 25A of starter 25 via switch 23. End 25B of starter 25 is connected to ground 10A. Switch 23 is implemented by an FET like switch 13, but is not used for charging capacitor 15 or 19, so that switch 23 is not needed to limit a current flowing therethrough. Switch 23 is necessarily implemented not by a semiconductor switching element, such as an FET, but by a relay.

Positive electrode 11A of battery 11 is electrically connected to end 25A of starter 25 via switch 27. This configuration forms a power-related wiring for allowing battery 11 to drive starter 25 without power stored in capacitors 15 and 19. Switch 27 is implemented by an FET like switch 13, but is not used for charging capacitor 15 or 19, so that switch 27 is not needed to limit a current flowing therethrough, and may be implemented by a relay like switch 23.

The signal-related wirings will be detailed hereinafter. Switches 13, 17, 21, 23, and 27 are electrically connected to controller 29 with the signal-related wirings. Controller 29 is implemented by a microprocessor and a peripheral circuit including a memory, and controls the entire vehicle 10C. In FIG. 1, wirings other than the signal-related wirings necessary for explaining vehicle power unit 10 are omitted.

Controller 29 supplies control signals SW1, SW2, SW3, SW4, and SW5 to switch 13, switch 17, switch 21, switch 23, and switch 27 to turn on and off signals SW1, SW2, SW3, SW4, and SW5, respectively.

Controller 29 includes an A/D converter for reading the following voltages. Controller 29 is connected to the positive electrode of battery 11 with the signal-related wiring for reading battery voltage Vb. An output from current sensor 33 is connected to controller 29 with the signal-related wiring for reading current I1. Positive electrode 15A of capacitor 15 is connected to controller 29 with the signal-related wiring, so that controller 29 reads capacitor voltage Vc1. Controller 29 is connected to an output from current sensor 37 with the signal-related wiring for reading electric current I2. Voltage detector 39 detects capacitor voltage Vc2 between positive electrode 19A and negative electrode 19B of capacitor 19. Controller 29 is connected to voltage detector 39 for reading capacitor voltage Vc2.

Controller 29 is electrically connected to starter 25 with the signal-related wiring, and outputs starter-driving signal ST for controlling the drive of starter 25. To be more specific, controller 29 outputs starter-driving signal ST to starter 25 while a voltage is applied between ends 25A and 25B of starter 25, thereby driving starter 25 to start operating. If controller 29 does not output starter-driving signal ST to starter 25 while the voltage is applied between ends 25A and 25B, starter 25 is not driven and does not start operating. When the voltage is not applied between ends 25A and 25B, starter 25 is not driven and does not start operating regardless of starter-driving signal ST.

An operation of vehicle power unit 10 will be described below.

Figure 2:
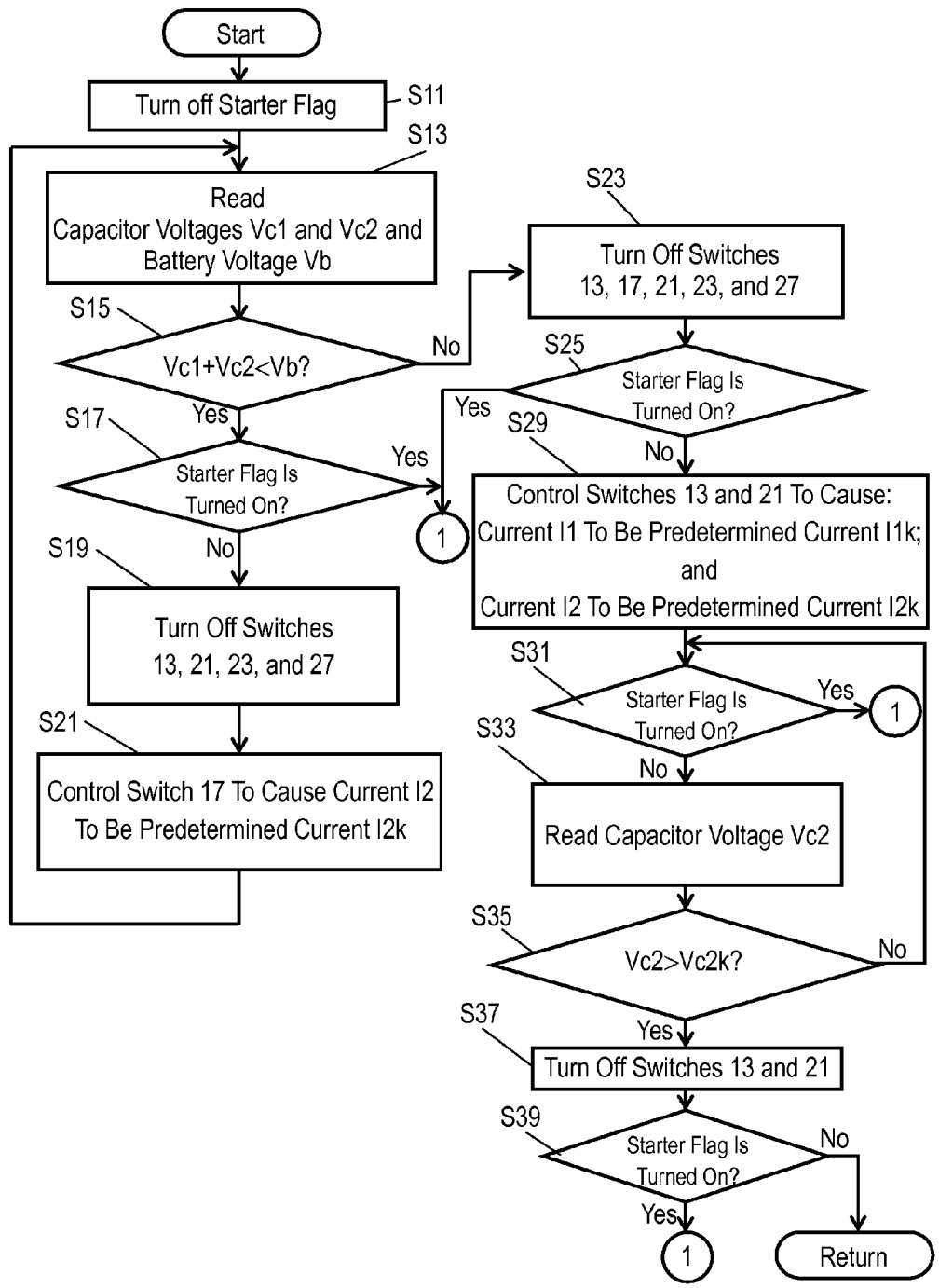
FIG. 2 is a flowchart of an operation of the vehicle power unit in accordance with the embodiment.
Figure 3:
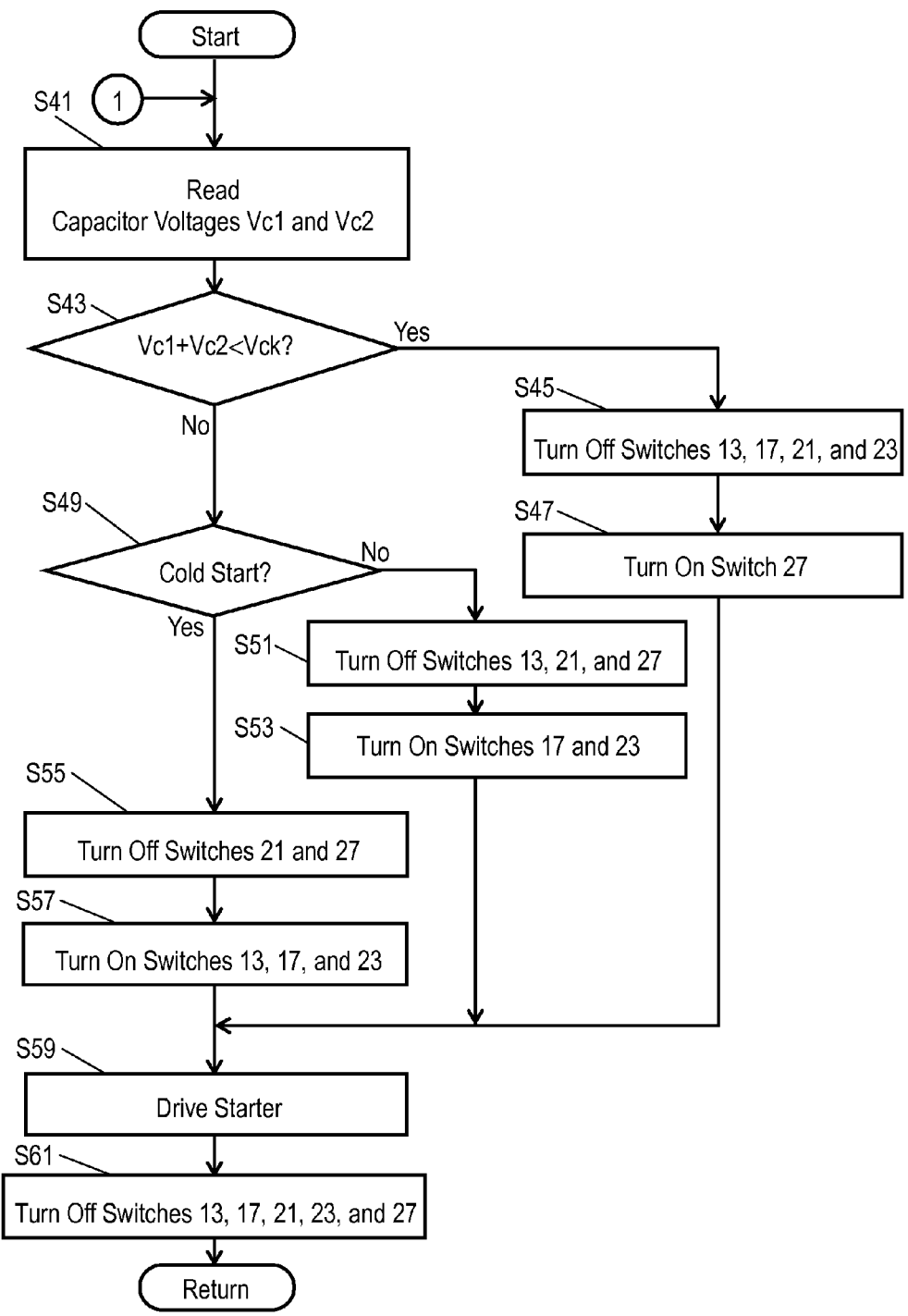
FIG. 3 is a flowchart of an operation of the vehicle power unit in accordance with the embodiment.

First, an operation to charge capacitors 15 and 19 will be described. FIG. 2 is a flowchart of an operation of vehicle power unit 10 charging capacitors 15 and 19, namely, shows a subroutine which is branched from a main routine and which causes controller 29 to charge capacitors 15 and 19. FIG. 3 is a flowchart of an operation of vehicle power unit 10 to drive starter 25, namely, shows a subroutine for driving starter 25. According to the main routine, controller 29 controls engine 10B in response to control data, such as a throttle position, to control a run of vehicle 10C. Upon executing the main routine, controller 29 turns off all switches 13, 17, 21, 23, and 27, in other words, all switches 13, 17, 21, 23, and 27 are turned off at the start of the flowchart shown in FIGS. 2 and 3. The subroutine shown in FIG. 2 is executed, e.g. in the case that a user unlocks and open a door at the beginning of use of vehicle 10C. While vehicle 10C is in use, any case other than the case that starter 25 is driven after ending the stop-idling. Since it is not predictable when the next stop-idling starts, controller 29 executes the subroutine shown in FIG. 2 immediately after the driving of starter 25 after ending the stop-idling so that starter 25 can be driven only by power stored in capacitors 15 and 19, not by power supplied from battery 11. This operation allows capacitors 15 and 19 to be charged quickly.

Upon executing the subroutine shown in FIG. 2, controller 29 turns off a starter flag (Step S11). The starter flag which is implemented by the memory is turned on when an interruption subroutine produces a starter-drive request that requests the driving of starter 25. The interruption subroutine is executed when a driver starts engine 10B or when the stop-idling ends. This interruption subroutine merely turns on the starter flag, and then, returns to a step at which the interruption is established.

Controller 29 turns off the starter flag at Step S11 to clear the starter flag that has been turned on by a previous interruption.

Then, controller 29 reads capacitor voltages Vc1 and Vc2, and battery voltage Vb (Step S13).

Next, controller 29 compares battery voltage Vb with the total voltage (Vc1+Vc2) which the sum of capacitor voltages Vc1 and Vc2 (Step S15). If the total voltage (Vc1+Vc2) is not higher than battery voltage Vb ("No" at Step 15), capacitors 15 and 19 store power causing the total voltage (Vc1+Vc2) to be not smaller than battery voltage Vb, and the process advances to Step S23.

On the other hand, if the total voltage (Vc1+Vc2) is lower than battery voltage Vb ("Yes" at Step S15), the power stored in capacitors 15 and 19 is small, so that controller 29 connects capacitor 15 in series to capacitor 19 and charges capacitors 15 and 19 with predetermined current I2k for quick charge. This operation reduces a difference between the total voltage (Vc1+Vc2) and battery voltage Vb, hence reducing a charge loss at switch 17. This increases a current for charging capacitors 15 and 19, and allowing capacitors 15 and 19 to be charged quickly accordingly.

The above operation will be detailed below.

If the total voltage (Vc1+Vc2) is smaller than battery voltage Vb at Step S15 ("Yes" at Step S15), controller 29 determines the status of the starter flag (Step S17). Since the starter flag is turned on by the interruption, it is not predictable when the flag is turned on during the implementation of the subroutine shown in FIG. 2. Controller 29 thus monitors the status of the starter flag throughout the subroutine shown in FIG. 2.

If the starter flag is turned on ("Yes" at Step S17), controller 29 advances the process to Step S41 shown in FIG. 3 in order to drive starter 25 for starting engine 10B.

If the starter flag is turned off ("No" at Step S17), on the other hand, controller 29 turns off switches 13, 21, 23, and 27 (Step S19). In other words, controller 29 turns off switches 13 and 21 to prepare for connecting capacitor 15 in series to capacitor 19. Since the starter flag is turned off ("No" at Step S17), starter 25 is not driven. Hence, controller 29 turns off switches 23 and 27.

Next, controller 29 reads current I2 with current sensor 37, turns on switch 17, and controls switch 17 in an active region of the FET implementing switch 17 to cause current I2 to be predetermined current I2k (Step S21). To be more specific, the gate voltage of the FET implementing switch 17 is changed to charge the series circuit of capacitors 15 and 19 with constant, predetermined current I2k. Predetermined current I2k is a current that can charge capacitors 15 and 19 as quick as possible such that the charging may not apply a load on batter 11, namely, the charging may not adversely affect the life time of battery 11. Predetermined current I2k is stored in the memory. Predetermined current I2k is properly determined according to the specification of vehicle power unit 10 since predetermined current I2k may change depending on the total capacitance of capacitors 15 and 19 connected in series, an upper limit of a current flowing through switch 17, and a permissible charging time besides the load on battery 11.

If the constant current charge starts at Step S21, controller 29 repeats the operations at in Steps S13, S15, S17, S19, and S21 to continue to charge capacitors 15 and 19 connected in series until the total voltage (Vc1+Vc2) of capacitor voltages Vc1 and Vc2 reaches battery voltage Vb.

If the total voltage (Vc1+Vc2) is not smaller than battery voltage Vb at Step 15 ("No" at Step S15), controller 29 turns off all switches 13, 17, 21, 23, and 27 (Step S23), thereby halting the charging capacitors 15 and 19 temporarily if the capacitors are charged.

Next, controller 29 determines the status of the starter flag (Step S25). This operation is the same as Step S17. If the starter flag is turned on at Step S25 ("Yes" at Step S25), controllers 29 advances the process to Step S41 shown in FIG. 3. On the other hand, if the starter flag stays is turned off at Step S25 ("No" at Step S25, controller 29 controls the FET implementing switch 13 in the active range of the FET as to limit current I1 such that current I1 read by current sensor 33 is predetermined current I1k (Step S29). Since switch 17 is turned off at Step S23, controller 29 connects capacitors 15 and 19 in parallel to each other at Step S29, and controls switches 13 and 21 such that capacitors 15 and 19 are charged with predetermined currents I1k and I2k, respectively. Predetermined current I1k is determined at Step S21 similarly to predetermined current I2k. At Step S29, predetermined current I1k thus is the same as predetermined current I2k.

Switch 21 is controlled at Step S29 such that current I2 is predetermined current I2k at Step S21. However, in the case that the difference between battery voltage Vb and capacitor voltage Vc2 is large, the charging of capacitor 19 with predetermined current I2k increases the loss at switch 21. In this case, current I2 may be controlled to be predetermined current I3k smaller than predetermined current I2k. If the difference between battery voltage Vb and capacitor voltage Vc2 is larger than a predetermined amount, controller 29 may control switch 21 to cause current I2 to be predetermined current I3k. If the difference is smaller than the predetermined amount, controller 29 may control switch 21 to cause current I2 to be predetermined current I2k. At Step S29, predetermined current I1k is the same as predetermined current I2k; however, if a load on battery 11 is not so large, predetermined currents I1k and I2k are not necessarily the same. Predetermined currents I1k, I2k, and I3k are determined appropriately according to the specification of vehicle power unit 10.

As discussed above, controller 29 is operable to charge capacitors 15 and 19 as follows. If the total voltage (Vc1+Vc2) is smaller than battery voltage Vb, controller 29 controls switches 13, 17, 21, 23, and 27 as to connect capacitors 15 and 19 in series to each other until the total voltage (Vc1+Vc2) reaches battery voltage Vb. To be more specific, controllers 29 turns off switches 13, 21, 23, and 27, and turns on switch 17 to control the current flowing through switch 17.

If the total voltage (Vc1+Vc2) becomes not smaller than battery voltage Vb while capacitors 15 and 19 are charged while capacitors 15 and 19 are connected in series, controller 29 is operable to control switches 13, 17, 21, 23, and 27 as to connect capacitors 15 and 19 in parallel to each other. To be more specific, controller 29 turns off switches 17, 23, and 27, and turns on switches 13 and 21 to control the currents flowing through switches 13 and 21.

In the above operation, the charging of capacitor 15 and 19 connected in series reduces the difference between the total voltage (Vc1+Vc2) and battery voltage Vb. This operation allows the current for charging the capacitors and accordingly reduces a time necessary for allowing the total voltage (Vc1+Vc2) to reach battery voltage Vb. As a result, the charge time can be shortened.

Capacitors 15 and 19 are charged with predetermined currents I1k and I2k at Step S29, respectively, thereby charging capacitors 15 and 19 up to the rated charging voltages thereof. Since the starter flag may be possibly turned on while capacitors 15 and 19 are charged, controller 29 determine the status of the starter flag after Step S29 (Step S31). When the starter flag is turned on at Step S31, controller 29 advances the process to Step S41 shown in FIG. 3. If the starter flag is turned off at Step S31 ("No" at Step S31), controller 29 reads capacitor voltage Vc2 (Step S33) to determine whether or not the charge is completed, and compares capacitor voltage Vc2 with predetermined voltage Vc2k (Step S35). Predetermined voltage Vc2k is the rated charging voltage, i.e. 5V. If capacitor voltage Vc2 is not higher than predetermined voltage Vc2k (=5V) at Step S35 ("No" at Step S35), controller 29 determines the status of the starter flag while charging capacitors 15 and 19 with predetermined currents I1k and I2k, respectively, at Step S31.

On the other hand, if capacitor voltage Vc2 is higher than predetermined voltage Vc2k at Step S35 ("Yes" at Step 35), the charging of capacitor 19 is completed, so that controller 29 may turn off switches 13 and 21 (Step S37), thereby halting the charging of capacitors 15 and 19.

Then, controller 29 determines the status of starter flag (Step S39). If the starter flag is not turned on ("No" at Step S39), controller 29 ends the subroutine shown in FIG. 2, and returns to the main routine. Since controller 29 continues monitoring the status of the starter flag during the main routine similarly to Step S39, controller 29 executes the subroutine shown in FIG. 3 if the starter flag is turned on even after the charging is completed and the subroutine shown in FIG. 2 ends.

On the other hand, if the starter flag is turned on at Step S39 ("Yes" at Step S39), controller 29 advances the process to Step S41 shown in FIG. 3.

If the charging of capacitor 19 is completed at Step S35 the charging of capacitor 15 is also completed for the following reason.

If the total voltage (Vc1+Vc2) is smaller than battery voltage Vb at Step S15, controller 29 connects capacitor 15 in series to capacitor 19 and charges the capacitors. When the total voltage (Vc1+Vc2) reaches battery voltage Vb (=12V) as a result of the charging, a voltage of each of the seven electric double layer capacitors connected in series becomes about 1.7V (=12V/7). Capacitor 15 includes five electric double layer capacitors while capacitor 19 includes two electric double layer capacitors. Capacitor voltage Vc1 becomes 8.5V and capacitor voltage Vc2 becomes 3.4V after the charging of the capacitors connected in series to each other (hereinafter referred to as a series charging).

The rated charging voltage of capacitor voltage Vc1 is 12.5V (=2.5V×5), and battery voltage Vb is 12V. Capacitor 15 connected in parallel to battery 11 can be charged until capacitor voltage Vc1 becomes battery voltage Vb at most. The maximum voltage of capacitor voltage Vc1 is referred to as predetermined voltage Vc1k (=Vb=12V). Capacitor 15 after the series charging needs another charge of 3.5V (=12V−8.5V=ΔV1) until capacitor voltage Vc1 reaches the rated charging voltage. Similarly, since predetermined voltage Vc2k of capacitor 19 is 5V, capacitor 19 still needs a charge of 1.6V (=5V−3.4V=ΔV2) until capacitor voltage Vc2 becomes the rated charging voltage.

In the case that the seven electric double layer capacitors have capacitances C identical to each other, charge amount Q1 necessary for charging capacitor 15 is calculated as Q1=ΔV1×C/5. Since ΔV1 is 3.5V, charge amount Q1 is 0.7·C. Similarly, charge amount Q2 necessary for charging capacitor 19 is calculated as Q2=ΔV2×C/2=0.8·C. Thus, charge amount Q2 for capacitor 19 is larger than charge amount Q1 for capacitor 15.

Since predetermined currents I1k and I2k are equally to each other as described above, capacitor 19 needs a longer time until the charging thereof is completed than capacitor 15. In vehicle power unit 10 in accordance with this embodiment, the charging of capacitor 15 is completed when the charging of capacitor 19 is completed.

In the subroutine shown in FIG. 2, controller 29 thus can determine that both of capacitor voltages Vc1 and Vc2 reach the own rated charging voltages by determining only the completion of the charging of capacitor 19.

In the case that capacitor 19 needs a longer time to complete the charging thereof than capacitor 15, the above operation in accordance with the embodiment can determine the completion of the charging of capacitors 15 and 19. Capacitor 15 may need a longer time to complete the charging thereof than capacitor 19 depending on the specification. In this case, capacitor voltage Vc1 of capacitor 15 is monitored for determining the completion of the charging, and capacitor Vc2 of capacitor 19 needs to be monitored to avoid an over voltage applied to capacitor 19.

In the case that a capacitor out of capacitors 15 and 19 is fully charged first is changed depending on a situation, controller 29 monitors both of capacitor voltages V1c and V2c for determining the completion of the charging of capacitors 15 and 19. When either one of capacitor 15 or 19 is fully charged, controller 29 stops charging the fully charged capacitor, and continues charging only the other capacitor.

Next, an operation of vehicle power unit 10 for driving starter 25 will be described below with reference to FIG. 3. When the interruption routine described above turns on the starter flag, controller 29 executes an operation of the flowchart shown in FIG. 3 upon being called from the main routine or upon advancing from the subroutine shown in FIG. 2.

In the flowchart shown in FIG. 3, controller 29 first reads capacitor voltages Vc1 and Vc2 (Step S41).

Next, controller 29 compares the total voltage (Vc1+Vc2) with predetermined total voltage Vck (Step S43). Predetermined total voltage Vck is the total voltage (Vc1+Vc2) provided when both of capacitors 15 and 19 are fully charged, and is 17V (=12V+5V) according to this embodiment as discussed above.

When the total voltage (Vc1+Vc2) is smaller than predetermined total voltage Vck ("Yes" at Step S43), capacitors 15 and 19 are not fully charged, so that the power stored in capacitors 15 and 19 may possibly fail to drive starter 25 sufficiently. If the total voltage (Vc1+Vc2) is smaller than predetermined voltage Vck at Step S43 ("Yes" at Step S43), controller 29 first turns off all switches 13, 17, 21, and 23 (Step S45), and then, turns on switch 27 only (Step S47). This operation prevents capacitors 15 and 19 from supplying the power to starter 25, and allows battery 11 to supply the power to starter 25 for driving starter 25 (Step S59).

On the other hand, if the total voltage (Vc1+Vc2) is not smaller than predetermined voltage Vck ("No" at Step S43), controller 29 determines whether or not starter 25 is to be driven at a cold start, i.e., at the beginning of use of vehicle 10C (Step S49). If vehicle 10C is not at the cold start at Step S49 ("No" at Step S49), vehicle 10C is in use, and engine 10B has already started but halts due to the stop-idling. Therefore, engine 10B and other accessories, such as hydraulic pumps, a compressor of an air-conditioner, have been warmed up, so that the restart of engine 10B needs less torque supplied from starter 25 than at the cold start. The series circuit including capacitors 15 and 19 can thus drive starter 25.

The driving of starter 25 with the series circuit of capacitors 15 and 19 connected in series allows battery 11 to supply almost no current to starter 25, so that battery voltage Vb can be stable. This prevents load 10D from operating unstably even if starter 25 is driven.

If vehicle 10C is not at the cold-start at Step S49 ("No" at Step S49), controller 29 turns off switches 13, 21, and 27 (Step S51), and then, turns on switches 17 and 23 (Step S53). This operation connects capacitors 15 and 19 to starter 25 while capacitors 15 and 19 are connected in series to each other. In this situation, switches 13 and 27 are turned off. Since the total voltage (Vc1+Vc2) is not smaller than predetermined voltage Vck (=17V) ("No" at Step S43) and is higher than battery voltage Vb (=12V), diode 35 is turned off. This operation disconnects battery 11 from starter 25, and connects capacitors 15 and 19 connected in series alone to end 25A of starter 25. This operation allows only the power stored in the series circuit including capacitors 15 and 19 to be supplied to starter 25. Then, starter 25 is driven at Step S59 by the power stored in the series circuit.

On the other hand, if vehicle 10C is at the cold-start at Step S49 ("Yes" at Step S49), engine 10B and accessories are cold, so that starter 25 needs larger torque for driving them than they are warm.

If vehicle 10C is started at the cold-start at Step S49 ("Yes" at Step S49), which requires larger torque for starter 25, controller 29 turns off switches 21 and 27 (Step S55), and then, turns on switches 13, 17, and 23 (Step S57). This operation allows switch 13 to connect battery 11 in parallel to capacitor 15 to form a parallel circuit of battery 11 and capacitor 15. Since switch 17 is turned on and switch 21 is turned off, capacitor 19 is connected in series to the parallel circuit of battery 11 and capacitor 15 connected in parallel to each other. Since switch 23 is turned on and switch 27 is turned off, the parallel circuit of battery 11 and capacitor 15 is connected to starter 25 via capacitor 19. This operation allows power of battery 11 and power stored in capacitors 15 and 19 to be supplied to starter 25. As a result, starter 25 receives the power great enough to start from battery 11 and capacitors 15 and 19 at the cold start that requires large torque.

Controller 29 outputs drive signal ST to starter 25 for driving and controlling starter 25 (Step S59), so that the power can be supplied to starter 25 from an optimum power source depending on the charged status of capacitors 15 and 19, and also depending on whether or not vehicle 10C is at the cold start. Starter 25 is driven only by the power from battery 11 only in the case that the total voltage (Vc1+Vc2) is smaller than predetermined total voltage Vck ("Yes" at Step S43). In the other case that the total voltage (Vc1+Vc2) is not smaller than predetermined voltage Vck ("No" at Step S43), the power from capacitors 15 and 19 in addition to the power from battery 11 drive starter 25, hence reducing a load on battery 11. When only the power from capacitors 15 and 19 instead of the power from battery 11 drives starter 25, in particular, almost no power from battery 11 is used and effectively reducing the load on battery 11. In the case that capacitor 19 is connected in series to the parallel circuit of battery 11 and capacitor 15, the power from capacitor 15 having a smaller inner resistance than battery 11 is supplied to the starter prior to the power from battery 11, accordingly reducing a current flowing from battery 11. This operation reduces the load on battery 11, and extends the life time of battery 11.

After starter 25 is driven to start engine 10B, it is not necessary to supply power to starter 25 any more. Then, controller 29 turns off switches 13, 17, 21, 23, and 27 (Step S61), and ends the subroutine shown in FIG. 3 and the process returns to the main routine.

The main routine restarts the subroutine shown in FIG. 2 after the end of the subroutine shown in FIG. 3 in order to immediately charge capacitors 15 and 19. This above operation is repetitively executed to reduce the load on battery 11 even if the stop-idling is executed.

According to this embodiment, when the subroutine shown in FIG. 3 ends, the subroutine shown in FIG. 2 immediately starts for charging capacitors 15 and 19; however, the process is not limited to these operations. Capacitors 15 and 19 can be charged while starter 25 is not driven. For instance, controller 29 controls switches 13, 17, 21, 23, and 27 to charge capacitors 15 and 19 with regenerative power generated by power generator 31 during deceleration of vehicle 10C. To be more specific, when controller 29 detects the regenerative power generated by the deceleration of vehicle 10C, controller 29 executes the subroutine shown in FIG. 2. This operation allows the regenerative power to be used more efficiently, thus improving a fuel efficiency of vehicle 10C in addition to the stop-idling system.

However, power generator 31 generates a voltage as high as 14.5V, which is higher than 12V, when it generates the regenerative power. When capacitors 15 and 19 connected in series to each other, the electric double layer capacitors do not receive an over-voltage. But, after the series connection, when capacitors 15 and 19 are connected in parallel to be charged, controller 29 monitors capacitor voltage Vc1 to prevent capacitor 15 from receiving the over-voltage. It is necessary to watch the over-voltage not only during using the regenerative power, but also during the use of the power generated by power generator 31 for charging capacitors 15 and 19.

Figure 4:
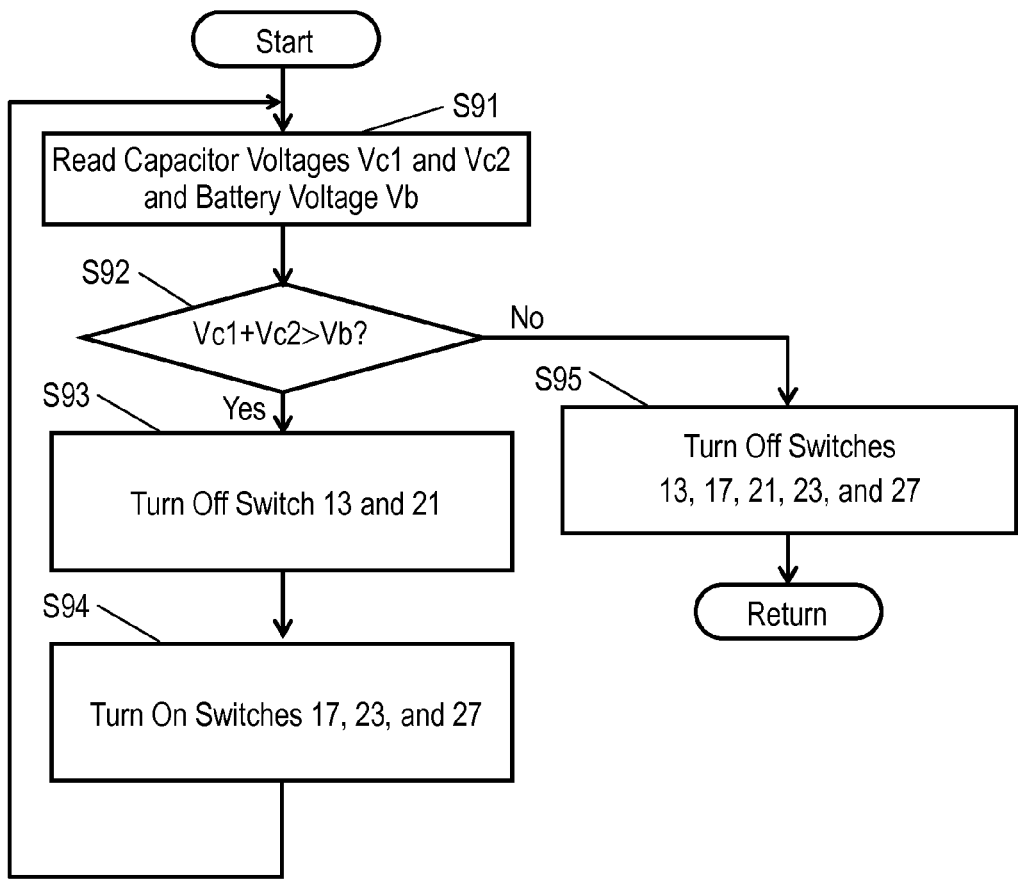
FIG. 4 is a flowchart of an operation of the vehicle power unit in accordance with the embodiment.

Next, an operation when the use of vehicle 10C ends is described below. FIG. 4 is a flowchart of the operation of vehicle power unit 10 when the use of vehicle 10C ends.

The driver turns off an ignition switch upon ending the use of vehicle 10C. At this moment, controller 29 executes the flowchart shown in FIG. 4. In this flowchart, all switches 13, 17, 21, 23, and 27 are turned off before the start of the flowchart. When the use of vehicle 10C ends, controller 29 first reads capacitor voltages Vc1 and Vc2 and battery voltage Vb (Step S91), and compares the total voltage (Vc1+Vc2) with battery voltage Vb (Step S92). If the total voltage (Vc1+Vc2) is higher than battery voltage Vb at Step S92 ("Yes" at Step S92), controller 29 controls switches 13, 17, 21, 23, and 27 such that the power stored in capacitors 15 and 19 charges battery 11. To be more specific, controller 29 turns off switches 13 and 21 (Step S93), and then, turns on switches 17, 23, and 27 (Step S94). When switches 17, 23, and 27 are turned on, a voltage is applied between ends 25A and 25B of starter 25; however, since the controller does not output starter-drive signal ST when the use of vehicle 10C ends, starter 25 is not driven. The above control allows the power stored in capacitors 15 and 19 to be supplied to battery 11 via switches 23 and 27 to charge battery 11. Controller 29 reads capacitor voltages Vc1 and Vc2 and battery voltage Vb at Step S91, and compares the total voltage (Vc1+Vc2) with battery voltage Vb at Step S92. The controller repetitively executes processes at Steps S91 to S94 to charge battery 11, accordingly decreasing the total voltage (Vc1+Vc2). When the total voltage (Vc1+Vc2) becomes not higher than battery voltage Vb ("No" at Step S92), controller 29 turns off all switches 13, 17, 21, 23, and 27 (Step S95), thereby stopping supplying the power from capacitors 15 and 19 to battery 11. Then, the process of controller 29 returns to the main routine and ends the control of vehicle 10C.

Upon the end of using vehicle 10C, controller 29 reads capacitor voltages Vc1 and Vc2 and battery voltage Vb at Step S91. If the total voltage (Vc1+Vc2) is not higher than battery voltage Vb at Step S92 ("No" at Step S92), controller 29 turns off all switches 13, 17, 21, 23, and 27 (Step S95), and returns to the main routine for ending the control of vehicle 10C.

The above control operation allows vehicle power unit 10 to use the power stored in capacitors 15 and 19 for charging battery 11 without wasting the power due to self-discharge. This operation can decrease capacitor voltages Vc1 and Vc2, and accordingly, extend the life time of the capacitors. The total voltage (Vc1+Vc2) applied to battery 11 can maintain battery voltage Vb at a high voltage and extend provides the battery with a long life time.

In the case that a large difference between the total voltage (Vc1+Vc2) and battery voltage Vb is specified, the above control operation may cause a large current. In this case, diode 35 may be replaced with another semiconductor switching element, such as an FET. In this case, the FET is connected such that a direction of a parasitic diode of the FET is the same as diode 35. The FET is controlled within an active region thereof such that current I2 cannot exceed a predetermined current. In this case, switches 23 and 27 are turned off.

The above operation allow vehicle power unit 10 to reduce a time when only battery 11 drives starter 25, and also to decrease a current flowing from battery 11. Vehicle power unit 10 can extend the life time of battery 11.

According to this embodiment, controller 29 connects capacitors 15 and 19 in series to each other for charging the capacitors if the total voltage (Vc1+Vc2) is smaller than battery voltage Vb. Controller 29 connects capacitors 15 and 19 in parallel to each other if the total voltage (Vc1+Vc2) becomes not smaller than battery voltage Vb. This control is not limited to this. If the total voltage (Vc1+Vc2) is smaller than battery voltage Vb, the controller connects capacitors 15 and 19 in parallel to each other from the first for being charged. In this case, controller 29 monitors both of capacitor voltages Vc1 and Vc2 of capacitors 15 and 19 to prevent the capacitors from receiving excessively-large voltages.

The order of turning on and off switches 13, 17, 21, 23, and 27 is based on the flowcharts shown in FIGS. 2 and 3 to avoid a short circuit of battery 11 or capacitor 15.

After the use of vehicle 10C, if the total voltage (Vc1+Vc2) is larger than battery voltage Vb, controller 29 charges battery 11 with the power stored in capacitors 15 and 19. This operation is not limited to this. For instance, in the case that the capacitances of capacitors 15 and 19 are large enough to prevent capacitors 15 and 19 from discharging, vehicle power unit 10 may include a discharging circuit that discharges capacitors 15 and 19 in order to extend the life time of the capacitors.

Figure 5:
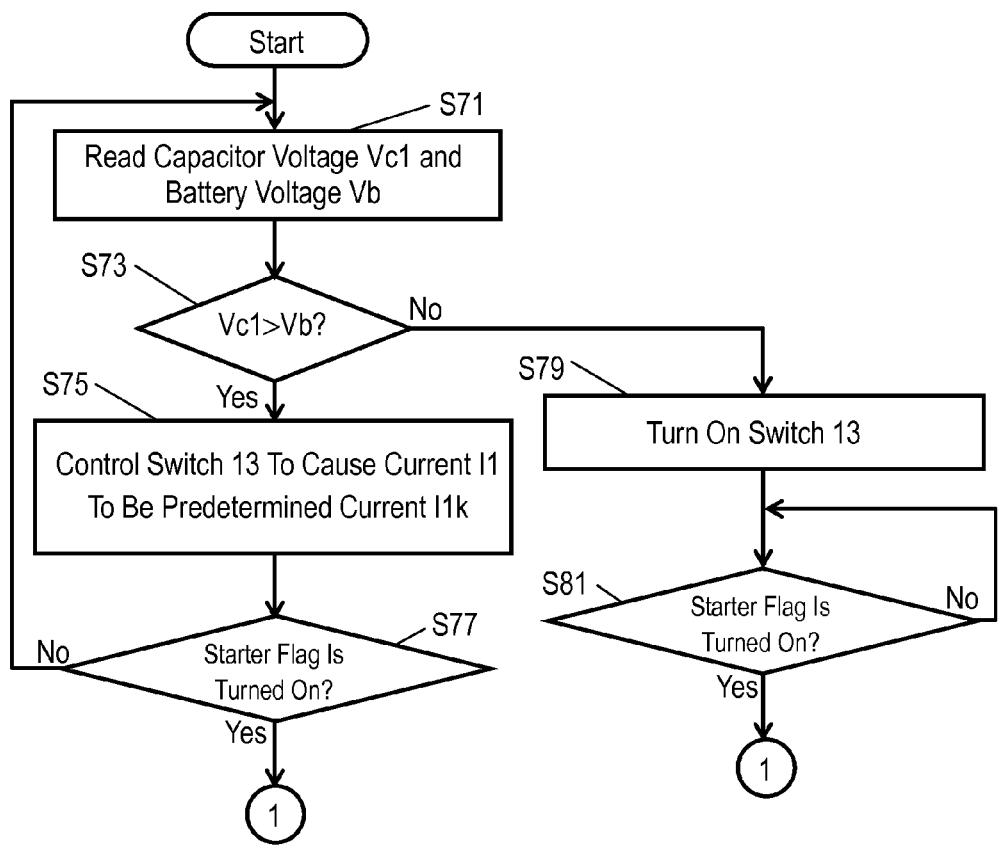
FIG. 5 is a flowchart of an operation of the vehicle power unit in accordance with the embodiment.
Figure 6:
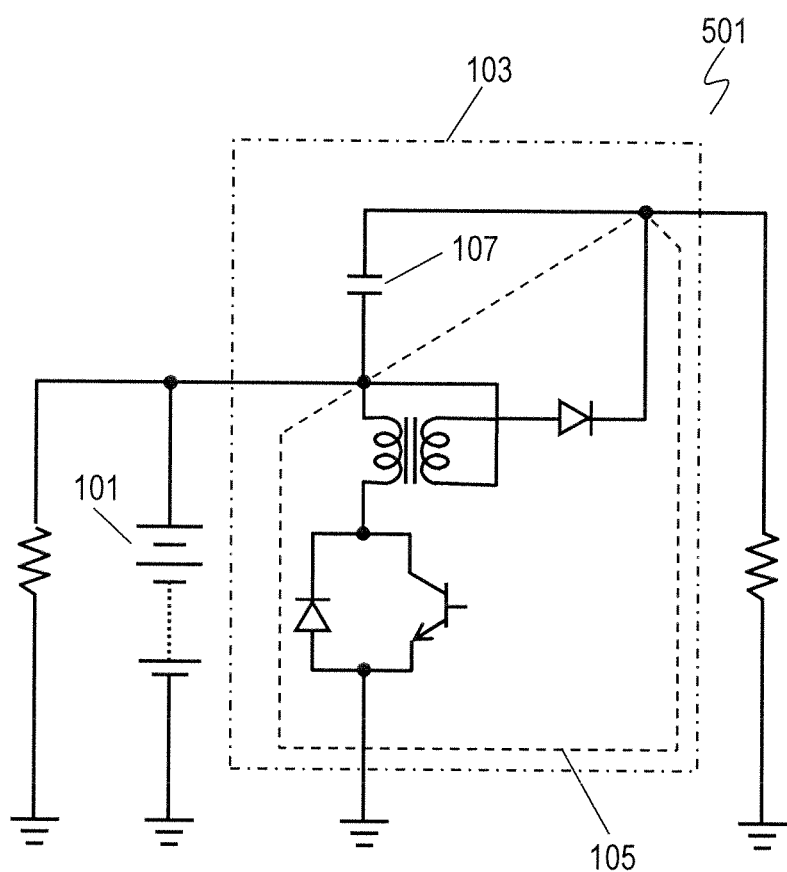
FIG. 6 is a circuit diagram of a conventional vehicle power unit.

FIG. 5 is a flowchart of an operation of vehicle power unit 10 operating during the stopping idling. In vehicle power unit 10, during the stopping of idling, if capacitor voltage Vc1 is larger than battery voltage Vb, controller 29 controls switch 13 to discharge capacitor 15. When the discharging causes capacitor voltage Vc1 to reach battery voltage Vb, controller 29 turns on switch 13.

When an instantaneous rush current occurs due to an operation-start of load 10D of vehicle 10C during the stopping idling, switch 13 controlled to discharge capacitor 15 or turned on, as discussed above, allows the rush current to flow from both of battery 11 and capacitor 15. This operation can suppress the current flowing from battery 11, accordingly reducing a load on battery 11 and extending the life time of battery 11.

The above operation of vehicle power unit 10 will be detailed below with reference to FIGS. 1 to 5. The flowchart shown in FIG. 5 shows a subroutine branched from the main routine of the microprocessor built-in controller 29. This subroutine is executed during stopping the idling.

When vehicle 10C halts and starts stopping the idling, controller 29 changes an operation from the main routine to the subroutine shown in FIG. 5. At this moment, the stop-idling is started, starter 25 is not driven. All switches 13, 17, 21, 23, and 27 are turned off due to operations at Steps S23 and S37 shown in FIG. 2.

The subroutine shown in FIG. 2 charges capacitors 15 and 19, and hence, is executed while the stop-idling is not performed. The subroutine shown in FIG. 5 is executed after the end of the subroutine shown in FIG. 2.

Upon starting the subroutine shown in FIG. 5, controller 29 first reads capacitor voltage Vc1 and battery voltage Vb (Step S71). Then, controller 29 compares capacitor voltage Vc1 with battery voltage Vb (Step S73). If capacitor voltage Vc1 is larger than battery voltage Vb at Step S73 ("Yes" at Step S73), controller 29 turns on switch 13 to discharge capacitor 15. This operation causes capacitor 15 to supply a rush current to battery 11 due to the difference between capacitor voltage Vc1 and battery voltage Vb. This rush current may cause an excessively-large current flowing through switch 13, and raise its temperature excessively, thus applying a load on switch 13. If capacitor voltage Vc1 is larger than battery voltage Vb at Step S73 ("Yes" at Step S73), controller 29 discharges capacitor 15. To be more specific, in this situation, controller 29 controls switch 13 as to cause current I1 flowing through current sensor 33 to be predetermined current I1k (Step S75). This operation allows predetermined current I1k to flow from capacitor 15 to discharge capacitor 15. In other words, controller 29 controls switch 13 such that capacitor 15 can be discharged with a constant current. As a result, capacitor 15 can be discharged without an additional load on switch 13.

The current discharged from capacitor 15 is supplied to battery 11 and load 10D. During the stopping idling, if capacitor voltage Vc1 is larger than battery voltage Vb, the power is supplied from capacitor 15 to load 10D.

In vehicle power unit 10, the current discharged from capacitor 15 at Step S75 is predetermined current I1k which is a constant current discharging capacitor 15. The discharge current at Step S75 is not limited to this instance, for instance, the discharge current can be determined as a predetermined current larger than or smaller than the predetermined current I1k. In the case that the discharge current is determined to be larger than the predetermined current I1k, capacitor 15 can be discharged faster; however, current I1 flowing to switch 13 becomes greater, so that switch 13 needs to be selected appropriately. On the other hand, in the case that the discharge current is determined to be smaller than the predetermined current I1k, the load on switch 13 can be reduced; however, capacitor 15 is discharged for a longer time. The discharge current, therefore, may be determined previously based on a necessary discharge time and characteristics of switch 13.

Capacitor 15 is discharged with the constant current; however, the discharge method is not limited to this constant-current discharge, which indeed maintains a constant current flowing to switch 13, so that the load to switch 13 can be regulated. If a large difference between capacitor voltage Vc1 and battery voltage Vb prolongs the discharge time, and a smaller difference shortens the discharge time. If the difference in discharge time is negligible with respect to an average time of the stopping idling, capacitor 15 can be discharged with a constant current regardless of the difference between capacitor voltage Vc1 and battery voltage Vb. However, if capacitor 15 has a large capacitance which increase the difference in discharge time, an operation after completion of the discharge may fail. Therefore, in the case that a predetermined discharge time is needed, controller 29 may control the discharge current to change in response to the difference between capacitor voltage Vc1 and battery voltage Vb.

Next, controller 29 determines a status of the starter flag (Step S77). If the starter flag is not turned on at Step S77 ("No" at Step S77), controller 29 repetitively executes operations at Steps S71, S73, S75, and S77 until capacitor voltage Vc1 becomes not larger than battery voltage Vb in Step S73.

On the other hand, if the starter flag is turned on at Step S77 ("Yes" at Step S77), controller 29 advances operation to the subroutine shown in FIG. 3 to drive starter 25. If the starter flag is turned on at this moment, starter 25 is driven while capacitor 15 is discharged. After the stopping idling, the operation to drive starter 25 follows Step S45 and onward or Step S51 and onward shown in FIG. 3, so that switch 13 is turned off in either case. When starter 25 is driven, the discharge from capacitor 15 to battery 11 is halted by executing the subroutine shown in FIG. 3.

If capacitor voltage Vc1 is not larger than battery voltage Vb at Step S73 shown in FIG. 5 ("No" at Step S73), capacitor voltage Vc1 reaches battery voltage Vb due to the discharge of capacitor 15. At this moment, there is little difference between capacitor voltage Vc1 and battery voltage Vb, so that almost no rush current flows even if switch 13 is turned on. Controller 29 thus turns on switch 13 (Step S79). This operation connects capacitor 15 in parallel to battery 11 after starting stopping idling.

As discussed above, during the stopping idling, the parallel circuit of battery 11 and capacitor 15 is connected to load 10D. At this moment, when load 10D starts operating, an instantaneous rush current may flow in load 10D. This causes a temporary voltage drop in battery voltage Vb and capacitor voltage Vc1 depending on inner resistances of battery 11 and capacitor 15. However, load 10D receives the power from both of battery 11 and capacitor 15, so that the amount of the voltage drop due to the rush current is smaller than a case that load 10D receives the power only from battery 11. This operation suppresses the current flowing from battery 11. As a result, the load on battery 11 can be reduced, and provide the battery with a long life time.

The small amount of the voltage drop stabilizes a voltage supplied to load 10D during the stopping idling.

Then, controller 29 determines the status of the starter flag (Step S81). If the starter flag is turned off ("No" at Step S81), controller 29 waits at Step S81 until the starter flag is turned on. If the starter flag is turned on ("Yes" at Step S81), controller 29 advances a process to Step S41 of the subroutine shown in FIG. 3 in order to drive starter 25. In this case, switch 13 is turned off at Step S45 or Step S51 shown in FIG. 3, similarly to the status of "Yes" at Step S77, so that the parallel circuit of battery 11 and capacitor 15 can be opened when starter 25 is driven.

In the case of "No" at Step S81, controller 29 waits at Step S81 until the starter flag is turned on. If the driver turns off the ignition switch while controller 29 waits at Step S81, controller 29 forcibly ends the operation shown in FIG. 5.

The connecting of battery 11 and capacitor 15 in parallel to each other due during the stopping idling due to the above structure and operation suppresses the current flowing from battery 11 in response to a fluctuation of load 10D. This operation provides vehicle power unit 10 with a small load on battery 11 and a long life time of battery 11.

In this embodiment, capacitors 15 and 19 are implemented by the electric double-layer capacitors; however, may be implemented by, e.g. other capacitors, such as electro-chemical capacitors, having large capacitances.

INDUSTRIAL APPLICABILITY

A vehicle power unit according to the present invention reduces a load on a battery and extends a life time of the battery, being useful particularly as a vehicle power unit for vehicles having a stop-idling system.

REFERENCE NUMERALS

10 Vehicle Power Unit
11 Battery
13 Switch (First Switch)
15 Capacitor (First Capacitor)
17 Switch (Second Switch)
19 Capacitor (Second Capacitor)
19C Node
21 Switch (Third Switch)
23 Switch (Fourth Switch)
25 Starter
27 Switch (Fifth Switch)
29 Controller
35 Diode (Semiconductor Switching Element)

The invention claimed is:

1. A vehicle power unit configured to be installed in a vehicle that includes an engine, a starter for starting the engine, and a battery for driving the starter, the vehicle power unit comprising:
a first switch configured to be connected to a positive electrode of the battery;
a first capacitor having a positive electrode and a negative electrode, the positive electrode of the first capacitor being configured to be connected to the positive electrode of the battery via the first switch, the negative electrode of the first capacitor being connected to a ground;
a second switch connected to the positive electrode of the first capacitor;
a second capacitor having a positive electrode and a negative electrode, the negative electrode of the second capacitor being connected to the positive electrode of the first capacitor via the second switch, the negative electrode of the second capacitor being connected to the second switch at a node;
a third switch connected between the ground and the node at which the second switch is connected to the negative electrode of the second capacitor;
a fourth switch connected to the positive electrode of the second capacitor;
a fifth switch configured to be connected between the starter and the positive electrode of the battery;
a semiconductor switching element connected to the 3ositive electrode of the second capacitor, and configured to connect and disconnect between the positive electrode of the battery and the positive electrode of the second capacitor; and
a controller for controlling the first switch, the second switch, the third switch, the fourth switch, and the fifth switch,
wherein the positive electrode of the second capacitor is configured to be connected to the starter via the fourth switch,
wherein the controller is operable to:
when not driving the starter, control the first switch, the second switch, the third switch, the fourth switch, and the fifth switch as to charge the first capacitor and the second capacitor;
when driving the starter, control the first switch, the second switch, the third switch, the fourth switch, and the fifth switch as to cause the battery to supply power to the starter if a total voltage of a first capacitor voltage which is a voltage between the positive electrode and the negative electrode of the first capacitor and a second capacitor voltage which is a voltage between the positive electrode and the negative electrode of the second capacitor is smaller than a predetermined total voltage;
when driving the starter, control the first switch, the second switch, the third switch, the fourth switch, and the fifth switch as to form a parallel circuit including the battery and the first capacitor connected in parallel to each other, and as to connect the second capacitor in series to the parallel circuit for supplying power to the starter if the total voltage is not smaller than the predetermined total voltage at a beginning of use of the vehicle; and
when driving the starter, control the first switch, the second switch, the third switch, the fourth switch, and the fifth switch as to disconnect the battery from the starter, and as to connect the first capacitor in series to the second capacitor for supplying power to the starter if the total voltage is not smaller than the predetermined total voltage during the vehicle in use.

2. The vehicle power unit according to claim 1, wherein the controller is operable to control the first switch, the second switch, the third switch, the fourth switch, and the fifth switch as to charge the first capacitor and the second capacitor with regenerative power produced during deceleration of the vehicle.

3. The vehicle power unit according to claim 1, wherein the controller is operable to;
control the first switch, the second switch, the third switch, the fourth switch, and the fifth switch as to connect the first capacitor in series to the second capacitor until the total voltage rises to a battery voltage which is a voltage of the battery if the total voltage is smaller than the battery voltage when charging the first capacitor and the second capacitor; and control the first switch, the second switch, the third switch, the fourth switch, and the fifth switch as to connect the first capacitor in parallel to the second capacitor if the total voltage is not smaller than the battery voltage when charging the first capacitor and the second capacitor.

4. The vehicle power unit according to claim 1, wherein the controller is operable to control the first switch, the second switch, the third switch, the fourth switch, and the fifth switch as to charge the battery with electric power stored in the first capacitor and the second capacitor e total voltage is higher than a voltage of the battery at an end of use of the vehicle.

5. The vehicle power unit according to claim 1, wherein the semiconductor switching element comprises a diode having an anode configured to be connected to the positive electrode of the battery and a cathode connected to the positive electrode of the second capacitor.

6. The vehicle power unit according to claim 1, wherein the controller is operable to:

control the first switch as to discharge the first capacitor if the first capacitor voltage is higher than a voltage of the battery while stopping idling of the vehicle; and turn on the first switch if the first capacitor voltage is not higher than the voltage of the battery while stopping the idling of the vehicle.

7. The vehicle power unit according to claim 6, wherein the controller s operable to control the first switch as to discharge the first capacitor with a constant current if the first capacitor voltage is higher than the voltage of the battery while stopping the idling of the vehicle.

* * * * *